United States Patent [19]

Kooy

[11] Patent Number: 4,608,776

[45] Date of Patent: Sep. 2, 1986

[54] CABINET FOR CUT-OFF FLOWERS

[76] Inventor: Hermen Kooy, 46, Stommeerkade, EK Aalsmeer, Netherlands

[21] Appl. No.: 600,386

[22] Filed: Apr. 16, 1984

Related U.S. Application Data

[62] Division of Ser. No. 403,050, Jul. 29, 1982, Pat. No. 4,458,501.

[51] Int. Cl.⁴ .............................................. A47F 3/04
[52] U.S. Cl. ........................................ 47/58; 62/251; 62/256; 312/116; 312/236; 47/41 R
[58] Field of Search ..................... 47/41, 17, 39, 58; 312/116, 236; 62/256, 251, 259

[56] References Cited

U.S. PATENT DOCUMENTS

| | | | |
|---|---|---|---|
| 1,617,940 | 2/1927 | Chase | 47/41 |
| 2,004,691 | 6/1935 | Friedrich | 47/41 |
| 2,081,048 | 5/1937 | Bate | 62/251 |
| 2,686,389 | 8/1954 | Rozell | 47/41 |
| 2,763,134 | 9/1956 | McDonald | 62/257 |
| 3,063,253 | 11/1962 | Dickson et al. | 62/256 |
| 3,459,116 | 8/1969 | McDonnell | 62/253 |
| 3,696,630 | 10/1972 | Bressickello | 62/256 |
| 4,458,501 | 7/1984 | Kooy | 62/256 |

Primary Examiner—Robert E. Bagwill
Attorney, Agent, or Firm—John P. Snyder

[57] ABSTRACT

Method and apparatus for prolonging the preservation of cut flowers involves cooling the bottom portion of a flower pot, which contains water in which the stems of cut flowers stand, while also cooling a semi-enclosed flower space with cooling air introduced in such fashion that the blooms of the cut flowers are not subjected to significant draft of the cooling air.

18 Claims, 3 Drawing Figures

U.S. Patent  Sep. 2, 1986  4,608,776
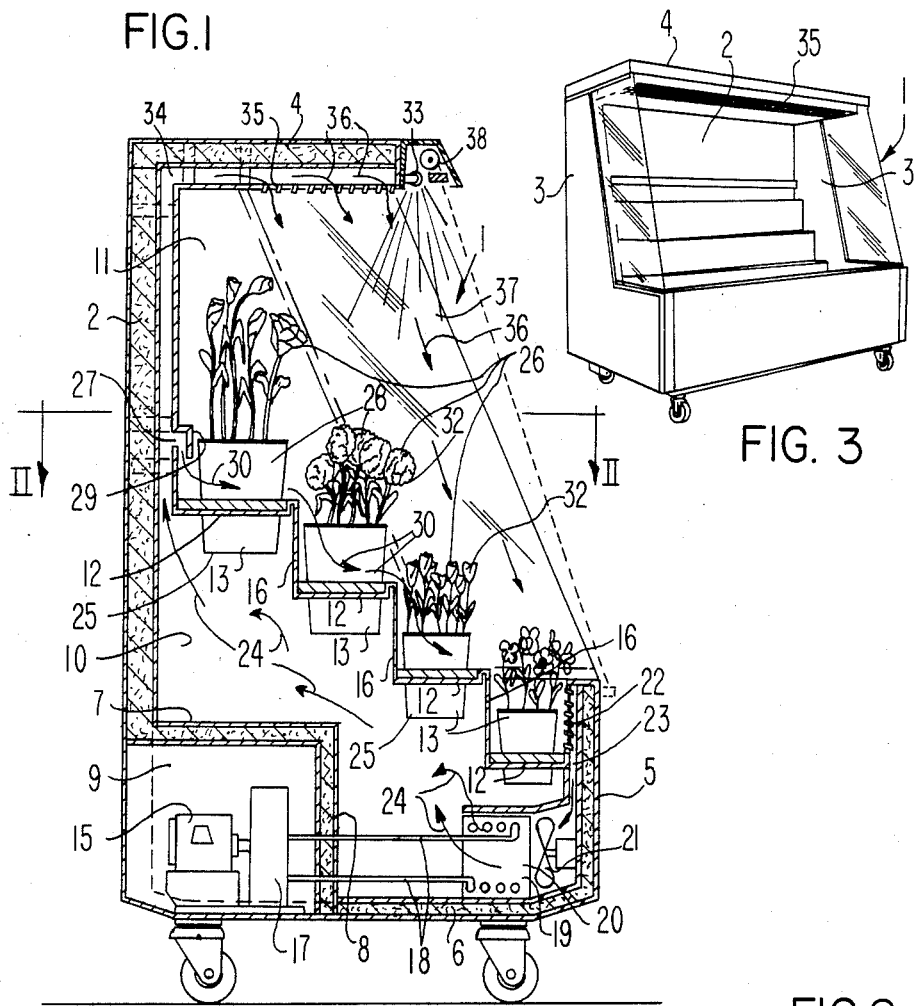
FIG. 1
FIG. 3
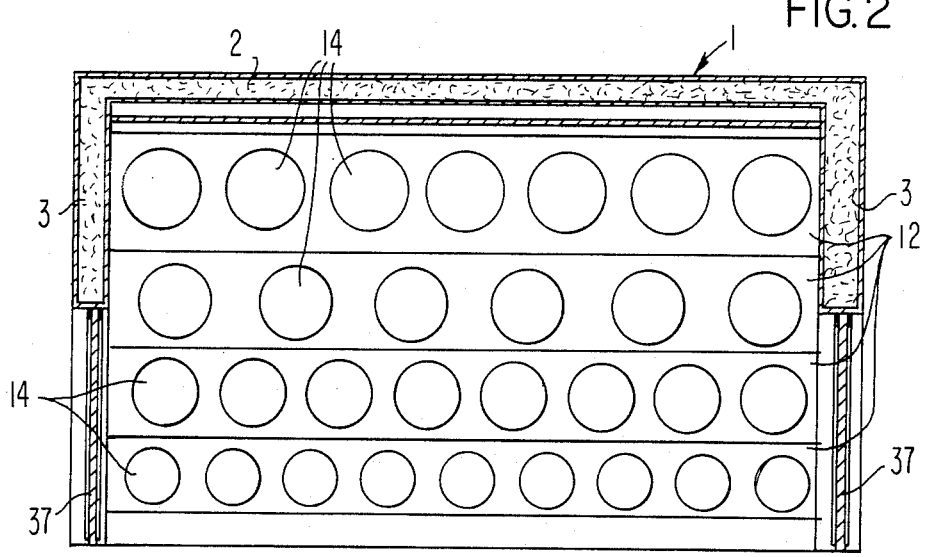
FIG. 2

CABINET FOR CUT-OFF FLOWERS

CROSS REFERENCE TO RELATED APPLICATION

This application is a division of my application Ser. No. 403,050, filed July 29, 1982 and now U.S. Pat. No. 4,458,501 issued July 10, 1984.

The invention relates to a cabinet for cut-off flowers, comprising at least one table to support flower boxes, a flower space bounded by cabinet walls and said table and comprising a cooling equipment.

Such a cabinet is known. In the known cabinet cold air is blown into the flower space so that the flowers stand in draft and wither.

The object of the invention is to provide a cabinet wherein the cut-off flowers can be kept well preserved so that they remain fresh for a much longer time.

To this aim the table has been provided with openings for receiving flower boxes, said openings admitting the flower boxes to extend through said openings into a cooling space.

In the cabinet according to the invention the flowers are cooled by cooling the water in the flower boxes in which the flowers have been put. In consequence thereof, a considerable cooling of the flowers can be realized, without, in an intolerable way, having the flowers stand in a draft.

Preferably, the cooling space opens via a cold air exhaust into the flower space at the level of the top side of the flower boxes. Thus even the flower space is considerably cooled by the cold air flow, streaming along the flower boxes below the flower heads, so that the flower heads are not struck by the cold air flow. In this way the flower boxes are specially cooled.

If the cooling space not only opens into the flower space on a low level, at the top side of the flower boxes, but also on a high level with a small cold air exhaust, only a small quantity of cold air is admitted in the top side of the flower space. This small quantity, however, does not cause an intolerable draft. On the other hand this cold air flow ensures the total flower space to stay fresh.

The mentioned and other features of the invention will be explained in the following description by reference to a drawing.

BRIEF DESCRIPTION OF THE DRAWING FIGURES

FIG. 1 is a vertical cross section through a preferred embodiment of the cabinet according to the invention, FIG. 2 is a horizontal cross section over line II—II in FIG. 1, and FIG. 3 is a perspective view on a smaller scale of the cabinet of FIG. 1.

DETAILED DESCRIPTION OF THE INVENTION

The cabinet 1 has isolating walls, namely a back wall 2, side walls 3, a top wall 4, a front wall 5, a bottom wall 6, and intermediate walls 7 and 8. The intermediate walls 7 and 8 separate a motor space 9 from a cooling space 10. The cooling space 10 is separated from a flower space 11 by means of a series of tables 12 and vertical strips 16, mounted between the tables 12 and adjoining same. The horizontal tables 12 are amphitheatrically arranged. The tables 12 are provided with openings 14 permitting flower boxes 13 to reach through said openings 14 into the cooling space 10. Preferably the flower boxes 13 are conical and consist for instance of pails. Their outer diameter is preferably chosen so, that the major part of the flower boxes reaches into the cooling space 10 and a top part only protrudes above the tables 12. The flower boxes 13 and the openings 14 of the most backward and highest table 12 are preferably the largest and their dimensions decrease stepwise in the direction of the lowest front table 12 (see FIG. 2).

The motor area 9 houses a motor 15 and a compressor 17 of the cooling equipment driven by said motor 15. The compressor 17 is connected through conduits 18 to an evaporator 19 opening into the cooling space 10. The inlet 20 of the evaporator 19 is provided with a ventilator 21 sucking air from the flower space 11 through a channel 23 and a grid 22. The cold air flows from the evaporator 19 as indicated by arrows 24 through the cooling space 10 and thus along the lower ends 25 of the flower boxes 13, thereby considerably cooling the water in the flower boxes 13 and consequently the flowers 26, standing in the water.

The cooling space 10 opens via cold air exhaust 27 at the level of the top ends 28 of the flower boxes 13 into the flower space 11. The cold air exhaust 27 consists of a narrow horizontal slit extending mainly over the length of the cabinet 1. The exhaust 27 bears a downwardly directed guiding strip 29, aiming the cold air flow as indicated by arrows 30 downwardly over the tables 12 along the top ends 28 of the flower boxes 13, and thus below the flower heads 32 of the flowers 26, standing in the flower boxes, in the direction of the cold air outlet, consisting of a grid 22.

At the inner side of the back wall 2 and top wall 4 an air channel 34, extending along the length of the cabinet 1, has been arranged, through which channel 34 a small quantity of cold air is introduced through a grid 35 in the top part of the flower space 11 according to arrows 36. This small quantity of cold air is just sufficient to keep the flower space 11 cool without causing an inadmissable cold air stream along the flower heads 32. The flower space 11 is bounded by isolated walls 2, 3 and 4 and the tables 12 with strips 16 and further by glass sheets 37, while the front side of the flower space 11 is open, so that the flowers are well visible and can be easily reached. In order to close the flower space 11 at night, a roller curtain 38 has been installed; the lines indicate the position of the roller curtain when it cover the front side of the cabinet 1. The top wall 4 has been provided with an illumination equipment 33.

What is claimed is:

1. The method of prolonging the lives of cut flowers while they are on display, which comprises the steps of:
    unidirectionally flowing cooled air through a partially confined space to define a display chamber having an interface between the flowing cooled air and ambient air through which the interior of the display chamber may be viewed and accessed;
    forcibly inducting the cooled air from the display chamber at a location therein which preserves the unidirectional flow of cooling air through the display chamber, and confining the inducted air to recycle through a cooling chamber and back into the display chamber;
    locating water within the cooling chamber and cooling the air flowing through the cooling chamber to cool the water; and immersing the stems of cut flowers in the water located and cooled within the cooling chamber while locating their blooms within the display chamber.

2. The method of prolonging the lives of cut flowers while they are on display, which comprises the steps of:
flowing cooled air downwardly through a partially confined space to define a display chamber having an interface between downwardly flowing cooled air and ambient air;
forcibly inducting the downwardly flowing cooled air from the display chamber at a region adjacent a lower edge span of the interface while confining the inducted air to recycle it through a cooling chamber and back into the display chamber to maintain the downward flow of cooled air within the display chamber having the interface with ambient air;
cooling the air within the cooling chamber; and
maintaining the stems of cut flowers immersed in water cooled by air flowing through the cooling chamber while maintaining their blooms within the display chamber.

3. The method of prolonging the lives of separate groups of cut flowers while they are on display, which comprises the steps of:
arranging the blooms of the cut flowers within a display chamber which is open to ambient atmosphere to define an interface with ambient atmosphere while immersing the stems of the cut flowers in water cooled by the atmosphere of a separate cooling chamber;
forcibly establishing and maintaining a constantly recirculating path of air to pass downwardly through the display chamber, then outwardly from the display chamber throughout a first localized lower region thereof and into the cooling chamber, and then back into the display chamber throughout a second localized upper region thereof which is remote from the first localized region so that downward air circulation past the blooms does not expose the blooms to excessive drafts of air; and
cooling the recirculating air within the cooling chamber so that the water within which the stems are immersed is cooled and then the cooled air is recirculated into the display chamber so that prolongation of life of the cut flowers is principally effected by the cooling of the water in which the stems are immersed and secondarily by the recirculation of cooled air through the display chamber.

4. The method of prolonging the lives of cut flowers while they are on display, comprising the steps of:
providing an isolated cooling space and a separate flower space which is open to ambient atmosphere;
disposing cut flowers with their blooms in said flower space and their stems extending into a plurality of separated bodies of water within the cooling space;
cooling air; and
circulating the cooled air to flow through the display space so that the flower blooms are not exposed to excessive drafts of cooled air and to flow around and past the separated bodies of water separately to cool each of said bodies of water within the isolated cooling space.

5. The method as defined in claim 4 wherein the circulation of air is effected by forcibly inducting air into the cooling space from the display space and the air is cooled in the isolated cooling space between the region of induction and the locations of the separate bodies of water so that the coolest air flows around and past the separated bodies of water.

6. The method as defined in claim 4 including the step of confining each of said bodies of water within a flower pot with a first part of the flower pots disposed in the cooling space and a second part of the flower pots disposed in the display space, the circulating cooled air first flowing over the first parts of the flower pots and subsequently flowing over the second parts of the flower pots.

7. The method of prolonging the lives of cut flowers while they are on display, which comprises the steps of:
providing a cooling space and a separate display space;
disposing cut flowers with their blooms in said display space and and their stems extending into water disposed in said cooling space;
cooling air;
circulating the cooled air to cool said water within the cooling space;
circulating the cooled air within the display space such that a portion of the cooled air does not impinge upon the flower blooms and a portion of the cooled air flows downwardly from above to impinge upon the flower blooms so that the flower blooms are not exposed to excessive drafts of air.

8. The method as defined in claim 7 wherein the cooled air is forcibly circulated through the cooling space and the display space.

9. The method as defined in claim 7 wherein a major portion of the cooled air circulated into the display space flows below the flower blooms and only a minor portion of the cooled air flows downwardly from above the flower blooms.

10. The method as defined in claim 7 wherein the stems of the flowers extend into separated bodies of water;
the circulating cooled air cooling each of said bodies of water.

11. The method as defined in claim 10 including the step of confining each of said bodies of water within a flower pot with a first part of the flower pots disposed within the cooling space and a second part of the flower pots disposed within the display space, the circulated cooled air first flowing over the first parts of the flower pots and subsequently flowing over the second parts of the flower pots.

12. The method of presenting cut flowers to viewing and direct access thereto by viewers while prolonging the lives of the cut flowers, which comprises the steps of:
(a) providing a vertically extending display space which is partially exposed to ambient atmosphere to present an open window through which the cut flowers may not only be viewed but also manually accessed and directly removed from the display space by a viewer;
(b) placing the blooms of cut flowers within the display space while immersing the stems of the cut flowers in water;
(c) preserving the cut flowers by flowing cooled air through the display space to cool the display space without exposing the blooms to excessive drafts of cooling air and to form an interface between cooled air and ambient atmosphere to define the window; and
(d) further preserving the cut flowers by additionally cooling the water in which the stems of the cut flowers are immersed separately from and in addition to the cooling effected in step (c).

13. The method as defined in claim 12 wherein the window defines at least one vertically extending side of the display space and the cooled air is flowed downwardly in step (c).

14. The method as defined in claim 13 wherein the water of step (b) is located below the display space.

15. The method as defined in claim 14 wherein step (d) is effected by circulating the cooled air from the display space into a cooling space, cooling the air in the cooling space and recycling the cooled air from the cooling space past the water and then back into the display space.

16. The method as defined in claim 14 wherein the step (b) comprises immersing separate bunches of stems in separate bodies of water and step (d) is effected by circulating the cooled air from the display space into a cooling space, cooling the air in the cooling space and recycling the cooled air from the cooling space past the separate bodies of water and then back into the display space.

17. The method of presenting cut flowers to viewing and direct access thereto by viewers while prolonging the lives of the cut flowers, which comprises the steps of:
 (a) providing a vertically extending display space which is partially exposed to ambient atmosphere to present an open window through which the cut flowers may not only be viewed but also manually accessed and directly removed from the display space by a viewer;
 (b) placing the blooms of cut flowers within the display space while immersing the stems of the cut flowers in water; and
 (c) cooling air and the water of step (b) externally of said display space and forcibly recirculating the cooled air through the display space to cool the display space without exposing the blooms to excessive drafts of cooling air and to form an interface between cooled air and ambient atmosphere to define the window.

18. The method as defined in claim 17 wherein step (b) comprises immersing stems of separate bunches of cut flowers into separate bodies of water which are cooled in step (c).

* * * * *